United States Patent [19]
Bueler

[11] 3,776,603
[45] Dec. 4, 1973

[54] CONTROL VALVE
[75] Inventor: Richard C. Bueler, Des Peres, Mo.
[73] Assignee: Wagner Electric Corporation, Newark, N.J.
[22] Filed: July 17, 1972
[21] Appl. No.: 272,308

[52] U.S. Cl. ............... 303/6 C, 188/349, 303/84 R
[51] Int. Cl. ............................................. B60t 11/34
[58] Field of Search ............... 303/6 C, 6; 188/152, 188/349; 137/102, 508, 505.25, 493, 493.7; 60/54.5 E, 84 A, 84 RR

[56] References Cited
UNITED STATES PATENTS
3,420,256 1/1969 Kobnick ........................... 303/6 C
3,492,052 1/1970 Klimek ............................. 303/6 C
3,653,721 4/1972 Klimek ............................. 303/6 C
3,653,722 4/1972 Klimek ............................. 303/6 C
3,721,473 3/1973 Budzich ........................... 303/6 C Primary Examiner—Duane A. Reger
Assistant Examiner—D. C. Butler
Attorney—Joseph E. Papin

[57] ABSTRACT

A control valve for varying brake pressures applied to front vehicle brakes includes a differential piston having ratio changing valve means therein.

25 Claims, 2 Drawing Figures

PATENTED DEC 4 1973  3,776,603

CONTROL VALVE

FIELD OF THE INVENTION

This invention relates generally to vehicle brake systems and in particular to control valves for use therein.

BACKGROUND OF THE INVENTION

In the past vehicle brake systems, the braking capacity between the front and rear axle brakes of a truck or tractor for use with a trailer was usually balanced or divided so that the front axle brakes accomplished 25 to 35 percent of the braking effort and the rear axle brakes accomplished the other 65 to 75 percent of such braking effort. Due to the Newtonian mechanics of decelerating or stopping a vehicle which involves the vehicle length of wheel base, static load distribution, and the height of the vehicle center of gravity from the roadbed, etc., the potential torque increase or increased braking effort of the front axle brakes due to high deceleration vehicle stops can be of such magnitude as to result in front to rear axle brake balance, or redistribution of such brake balance, in the range of 50 percent for the front axle brakes and 50 percent for the rear axle brakes or perhaps even greater. In order to take advantage of the front to rear axle brake torque redistribution, front axle brakes having the capacity to accommodate such redistribution must be provided on the vehicle, such as front axle brakes having significantly greater torque or braking effort generating potential. When the front axle brakes having the aforementioned significantly greater torque or braking effort generating potential was provided on the vehicle, the aforementioned redistribution of front to rear axle braking efforts effected during rather high vehicle decelerations resulted in the following undesirable or disadvantageous features: (1) an increasing tendency for early front wheel skidding; (2) a deleterious effect on vehicle steerability; (3) a deleterious imposition of increased loads or forces on the vehicle front suspension components during braking; and (4) a deleterious imposition of significantly increased loads on the vehicle front tires during braking which results in premature front tire wear. From the foregoing, it is apparent that high levels of front axle brake torque are required to produce high vehicle deceleration rates, but high levels of front axle brake torque can only be utilized if high vehicle decelerations were actually produced; however, this apparent paradox was due to the fact that high vehicle deceleration rates were required to effect sufficient weight transfer to the front axle to effect the utilization of the large magnitudes of front axle torque.

The principle object of the present invention is to provide a control valve for use in a vehicle brake system to predeterminately control fluid pressure applied to the vehicle front axle brakes which overcomes the aforementioned disadvantageous or undesirable features, and this, as well as other objects and advantageous features of the present invention, will become apparent from the specification which follows.

SUMMARY OF THE INVENTION

Briefly, the present invention includes a control valve having modulating means movable therein for performing modulating operations on fluid pressure supplied thereto to establish an applied fluid pressure in a predetermined ratio with the supplied fluid pressure, said modulating means defining a ratio chamber in said control valve, and other means in said modulating means for metering supplied fluid pressure to said ratio chamber to assist the modulating operation of said modulating means.

RELATED PATENTS

This patent application is related to U.S. Pat. No. 3,492,052 issued to B. Klimek on Jan. 27, 1970, but this patent application is a patentably distinct improvement.

BRIEF DESCRIPTION OF THE DRAWINGS

In the drawings which illustrate an embodiment of the present invention and wherein like numerals refer to like parts wherever they occur.

DETAILED DESCRIPTION OF THE INVENTION

Figure 1:
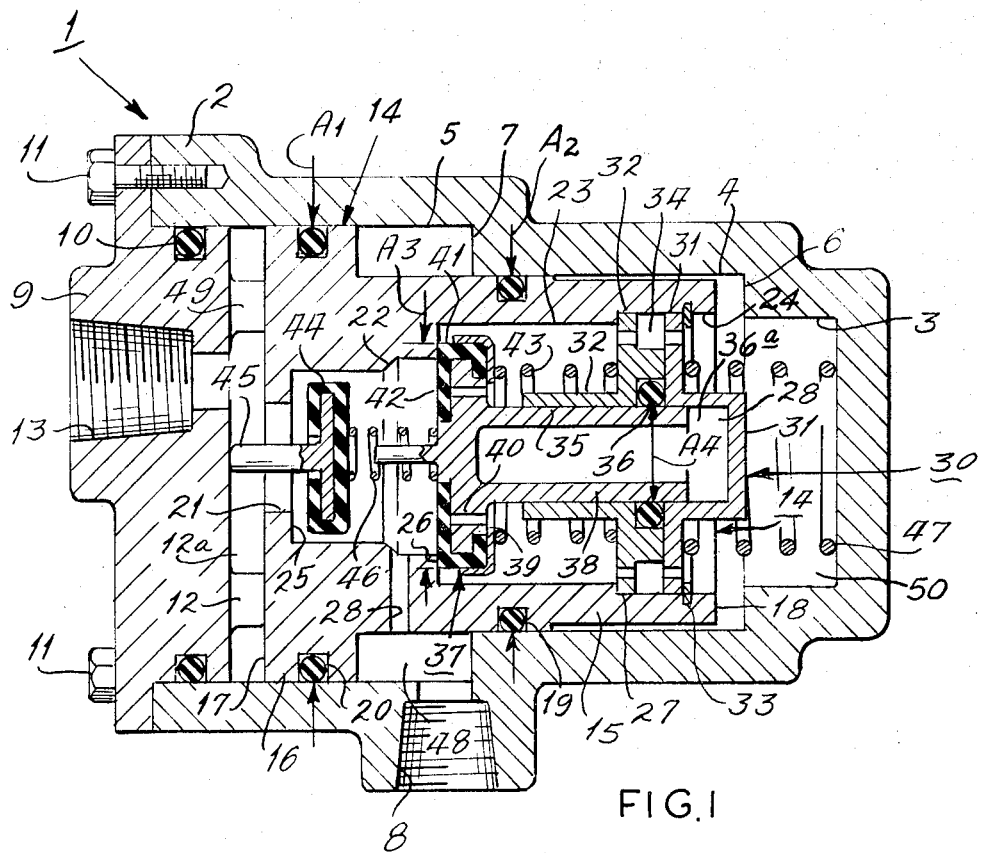
FIG. 1 is a sectional view showing a control valve embodying the present invention in cross-section.

Referring now to the drawings in detail and in particular to FIG. 1, a control valve 1 is provided with a housing 2 having a bore 3 therein axially aligned with stepped counterbores 4, 5, and annular shoulders or abutments 6, 7 are provided on said housing between the bore and counterbore 3, 4 and between the counterbores 4, 5, respectively. An inlet port 8 which is adapted for connection with the vehicle brake system foot or application valve (not shown) is provided in the housing 2 intersecting with the counterbore 5 adjacent to the shoulder 7, and a closure member or end plug 9 is received in the leftward or open end of said counterbore having a peripheral seal 10 in sealing engagement with said counterbore. The closure member 9 is retained in the housing counterbore 5 against displacement by suitable retaining means, such as a plurality of studs 11, connected between the housing and closure member 2, 9. A plurality of abutments or spacers 12 which extend into the counterbore 5 are integrally provided on the interior end 12a of the closure member 9, and an outlet port 13 which is adapted for connection with the vehicle front axle brakes (not shown) is provided through said closure member connecting with said counterbore.

A modulating or resiliently urged member, such as the stepped piston indicated generally at 14, is provided with an extension or body portion 15 slidably received in the housing counterbore 4 having a radially extending flange 16 integrally formed therewith slidably received in the housing counterbore 5, and opposed free ends 17, 18 are also provided on said stepped piston for respective engagement with the closure member abutment 12 and housing shoulder 6. Peripheral seals 19, 20 are carried in the piston extension and flange portions 15, 16 in sealing engagement with the housing counterbores 4, 5, respectively, and a bore 21 which intersects with the piston end 17 is aligned with stepped counterbores 22, 23, 24 which extend substantially coaxially through the piston 14 intersecting with the free end 18 thereof. Annular shoulders 25, 26, 27 are provided on the piston 14 between the piston bore and counterbore 21, 22 and between the piston counterbores 22, 23 and 23, 24, respectively, said shoulders 25, 26 defining valve seats, and a radially extending passage 28 is provided in said piston connecting between the piston counterbore 22 and the piston periphery adjacent to the flange 16 to connect the piston counterbore 22 in open pressure fluid communication with the inlet port 8.

A valve guide member, indicated generally at 30, compositely formed by a cup shaped retainer 31 and a cooperating spacer 32 abuttingly engaged therewith is disposed in the piston counterbore 24 in abutting engagement with the piston shoulder 27 and maintained against displacement therefrom by a snap ring and groove assembly 33 provided in said piston counterbore. A plurality of peripheral passages 34 are axially provided through the valve guide 30 interconnecting the piston counterbores 23, 24 with the housing bore 3, and an axial, blind, valve stem receiving bore 35 is centrally provided in said valve guide having a seal 36 disposed therein.

A proportioning, modulating or metering valve member 37 is provided with a stem portion 38 which is slidably received in the valve guide bore 35 in sealing engagement with the seal 36, and an atmospheric chamber 36a is defined in said valve guide bore between said valve stem and the retainer member 31. The valve stem 38 is integrally formed with a head portion 39 having a plurality of return flow passages 40 therethrough. An annular seal or cup member 41 is disposed on the valve member head portion 39 having a flapper or lip portion 42 sealably engaged with said head portion about the return flow passages 40 to normally close said return flow passages. A metering or valve spring 43 is biased between the valve guide member 30 and the valve member head 39 normally urging the valve member 37 leftwardly to engage the seal 41 thereof in sealing engagement with the piston valve seat 26 interrupting pressure fluid communicating between the piston counterbores 22, 23. Another modulating or metering valve member 44 is disposed in the piston counterbore 22 for engagement with the piston valve seat 25, and an integrally formed valve stem 45 is provided on said valve member extending through the piston bore 21 for abutting or valve positioning engagement with the interior end 12a of the closure member 9. A valve spring 46 of negligible compressive force is biased between the valve members 37, 44, and a modulating or metering spring 47 is precompressed between the end wall of the housing bore 3 and the valve guide member 30 normally urging the piston end 17 into engagement with the closure member abutments 12 and engaging the valve stem 45 with the interior end of the closure member 9 to drive the valve member 44 against its return spring 46 toward a position disengaged from the piston valve seat 25 to establish pressure fluid communication between the inlet and outlet ports 8, 13.

An inlet chamber 48 is defined by the piston counterbore 22, the connecting passage 28 and the housing counterbore 5 between the piston flange seal 20 and the housing shoulder 7, and said inlet chamber is connected in open pressure fluid communication with the inlet port 8. An outlet chamber 49 is defined in the housing counterbore 5 between the interior end of the closure member 9 and the leftward end 17 of the piston 14, and said outlet chamber is connected in open pressure fluid communication with the outlet port 13. A booster or ratio changing chamber 50 is defined in the piston counterbores 23, 24 and housing bore and counterbore 3, 4 between the end wall of said housing bore and the sealing engagement of the valve member 44 with the piston valve seat 26.

The sealing engagement of the piston seals 20, 19 with the housing counterbores 5, 4 define effective areas $A_1$, $A_2$ which are subjected to fluid pressure in the outlet and booster chambers 49, 50, respectively, and area $A_1$ is predeterminately greater than area $A_2$. The sealing engagement of the valve member 44 with the piston valve seat 26 defines an effective area $A_3$ on said piston which is subjected to the fluid pressure in the inlet chamber 48, and to complete the description of the control valve 1, the sealing engagement of the valve guide seal 36 with the valve stem 38 defines an effective area $A_4$ which is subjected to the atmosphere in the valve guide member atmospheric chamber 36a.

OPERATION

With the component parts of the control valve 1 positioned as shown in FIG. 1, and as described hereinbefore, supplied or input fluid pressure P delivered by the operator actuation of the vehicle brake system foot or application valve (not shown) to the inlet port 8 flows therefrom through the inlet and outlet chambers 48, 49 to establish an applied or output fluid pressure Po at the outlet port 13 for transmission to the vehicle front axle brakes (not shown). The input fluid pressure P acts on the input area $A_1 - A_2$ of the piston 14 creating an input force P $(A_1 - A_2)$ which is additive to the compressive force Fc of the metering spring 43 and opposed to the output force Po $A_1$ created by the output fluid pressure Po acting on the output area $A_1$ of said piston. When the output force Po $A_1$ attains a magnitude balancing the opposing input and spring forces P $(A_1 - A_2)$, Fc, the piston 14 is moved rightwardly in the housing 2 toward an isolating position engaging the piston valve seat 25 in lapped relation with the valve member 44 and isolating the input and output fluid pressures P, Po. From the graphical representation in FIG. 2, it is obvious that the input and output fluid pressures P, Po are blended or substantially equal in the range OM of the line OS.

Figure 2:
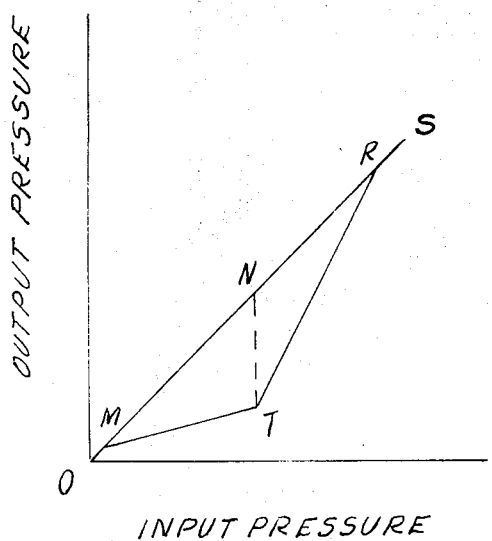
FIG. 2 is a graphical representation illustrating the applied or output fluid pressure effected by the control valve of FIG. 1 in response to the supplied or input fluid pressure as compared with a theoretical or ideal curve.

When the input fluid pressure P at the inlet port 8 is increased in excess of the predetermined value M but less than the predetermined value N, as shown on the line MN in the graph of FIG. 2, the input force P $(A_1 - A_2)$ is correspondingly increased and assisted by the spring force Fc to move the piston 14 leftwardly toward a metering position disengaging the piston valve seat 25 from the valve member 44 to establish metered pressure fluid communication between the inlet and outlet ports 8, 13 and effect a metered increase in the output fluid pressure Po at said outlet port to a valve in excess of the predetermined value M but less than the predetermined value T, as shown by the line MT in the graph of FIG. 2. Of course, the output force Po $A_1$ is correspondingly increased with the output fluid pressure Po at the outlet port 13, and when the output force Po $A_1$ is so increased to balance the opposing increased input force P $(A_1 - A_2)$ and the spring force Fc additive thereto, the piston 14 is again moved rightwardly in the housing toward its isolating position re-engaging the piston valve seat 25 in lapped relation with the valve member 44 to again isolate the input fluid pressure P at the inlet port 8 from the proportionally reduced output fluid pressure Po at the outlet port 13. From the graph of FIG. 2, it is apparent that increases in the input fluid pressure in excess of the predetermined value M but less than the predetermined vlaue N, as shown by the line MN, will result in proportionally reduced increases in the output fluid pressure Po in a predetermined ratio therewith, as shown by the line MT, wherein:

$$Po = P(A_1 - A_2) + Fc/A_1.$$

When the input fluid pressure $P$ is further increased in excess of the predetermined value N but less than the predetermined value R, as shown in the line MR in the graph of FIG. 1, the input force $P A_3$ of the input fluid pressure $P$ acting on the area $A_3$ of the piston 37 overcomes the opposing force Fs of the metering spring 43 to move said piston 37 rightwardly in the guide member bore 35 toward a metering position disengaging the valve seal 41 from the piston valve seat 26 to effect metered pressure fluid communication between the inlet port 8 and the chamber 50 and establish another proportionally reduced applied or ratio fluid pressure Pr in said chamber acting on the output area $A_3 - A_4$ of said piston to establish an output force $Pr (A_3 - A_4)$ which is additive to the spring force Fs and opposed to the input force $P A_3$. The increased ratio fluid pressure Pr in the chamber 50 effects a corresponding increase in the output force $Pr (A_3 - A_4)$, and when the increased output force $Pr (A_3 - A_4)$ and the spring force Fs additive thereto again balance the opposed input force $P A_3$, the piston 37 is moved leftwardly to reengage the piston valve member 41 in lapped relation with the valve seat 26 again interrupting pressure fluid communication between the inlet and ratio chambers 48, 50. The relationship between the input and ratio fluid pressures P, Pr is as follows: $Pr = P A_3 - Fs/A_3 - A_4$.

Of course, the established proportionally reduced fluid pressure Pr in the ratio chamber when the magnitude of the input fluid pressure P is between the predetermined values N, R, as shown in the line NR in the graph of FIG. 2, acts on the rationing or boosting area $A_2$ of the piston 14 to establish a ratio or booster force $Pr A_2$ which is additive to the input force $P (A_1 - A_2)$ to assist the metering or proportioning actuation of the piston 14 in response to the input fluid pressure P acting thereon, as previously discussed, and establish the output fluid pressure Po in a different predetermined ratio therewith. For instance, from the graph of FIG. 2, it is obvious that increases in the input fluid pressure P between the predetermined values N, R, as shown by the line NR, will result in proportionally reduced increases in the output fluid pressure Po in another predetermined ratio therewith, as shown by the line TR, wherein: $Po = P (A_1 = A_2) + Pr A_2 + Fc/A_1$.

When the magnitudes of the input and output fluid pressures P, Po exceed the predetermined value R, as shown in the graph of FIG. 2, the input force $P A_3$ acting on the piston 37 overcomes the output force $Pr (A_3 - A_4)$ and additive spring force Fs acting thereon to move said piston rightwardly toward passage opening or open pressure fluid communication position engaged with the leftward end of the valve guide member 30 and disengaging the piston valve member 41 from the valve seat 26 to establish open pressure fluid communication between the inlet and ratio chambers 48, 50 and blend the input and ratio fluid pressures P, Pr. At the same time, the increased additive input, ratio and spring forces $P (A_1 - A_2)$, $Pr A_2$ and Fc overcome the output force $Po A_1$ to move the piston 14 leftwardly toward its original open flow passage or inoperative position engaging the piston leftward end 17 with the closure member abutments 12 and disengaging the piston valve seat 25 from the valve member 44 to establish open pressure fluid communication through the inlet and outlet chambers 48, 49 between the inlet and outlet ports 8, 13 thereby blending the input and output fluid pressures P, Po, as shown on the line RS in the graph of FIG. 2.

When the desired vehicle braking effort is attained by the actuation of the control valve 1, as described hereinbefore, the inlet fluid pressure P at the inlet port 8 is vented to atmosphere which eliminates the input forces $P (A_1 - A_2)$, $P A_3$ respectively acting on pistons 14, 37. If the piston 14 is in its open passage position with the valve seat 25 disengaged from the valve member 44, the output fluid pressure Po at the outlet port 13 will also be exhausted through the inlet and outlet chambers 48, 49 to the inlet port 8 to eliminate the output force $Po A_1$; however, if the piston 14 is in its isolating position with the seat 26 engaged with the valve member 44, as previously described, the output fluid pressure Po acts on the effective area of said valve member to move it against its return spring 46 toward a position disengaged from the valve seat 25 establishing exhausting pressure fluid communicating through the inlet and outlet chambers 48, 49 between the inlet and outlet ports 8, 13 to effect the exhaustion of the output fluid pressure Po and the elimination of the output force Po $A_1$ upon the exhaustion of the input fluid pressure P. At the same time, the exhaustion of the input fluid pressure P establishes a pressure differential across the valve member 41 between the inlet and ratio chambers 48, 50, and the ratio fluid pressure Pr in the chamber 50 returns therefrom through the return flow passages 40 in the piston 37 displacing the lip 42 of said valve member from engagement with said piston and exhuasts through the inlet port and chamber 8, 48 thereby eliminating the output force $Pr (A_3 - A_4)$ acting on the piston 37 and the ratio force $Pr A_2$ acting on the piston 14. Upon the exhaustion of the input, output and ratio fluid pressures P, Po and Pr, the force Fc of the metering spring 47 is effective to urge the piston 14 toward its open passage or inoperative position engaging the piston end 17 with the closure member abutments 12, as shown in FIG. 1.

From the foregoing, it is now apparent that a control valve 1 meeting the objects and advantageous features set forth hereinbefore, as well as others, is disclosed and that changes as to the precise configurations, shapes and details of the construction set forth in the disclosure by way of illustration may be made by those skilled in the art without departing from the spirit of the invention.

I claim:

1. A control valve comprising a housing, an inlet port, an outlet port modulating means movable in said housing and defining with said housing a pressure fluid flow passage therethrough between said inlet and outlet ports, and a chamber, said modulating means being generally operable to perform modulating operations on fluid pressure supplied to said flow passage to effect the application therethrough of a reduced fluid pressure under preselected conditions, and other modulating means movable in said first named modulating means between said flow passage and said chamber, said other modulating means being generally operable to perform modulating operations on the supplied fluid pressure in said flow passage to establish another reduced fluid pressure in said chamber acting on said first named modulating means to assist the modulating operation thereof under other preselected conditions.

2. A control valve comprising a housing, an inlet port, an outlet port, proportioning valve means defining with said housing a pressure fluid flow passage therethrough between said inlet and outlet ports, and a separate expansible fluid pressure chamber and movable in said housing for performing proportioning operations on fluid pressure supplied to said flow passage under preselected conditions, said proportioning valve means being operable generally in response to the supplied fluid pressure to effect the application of a proportionally reduced applied fluid pressure through said flow passage under preselected conditions, passage means in said proportioning valve means between said flow passage and said chamber, and other proportioning valve means movable in said passage means for performing proportioning operations on the supplied fluid pressure under other preselected conditions, said other proportioning valve means being operable generally in response to the supplied fluid pressure to effect the application of another proportionally reduced applied fluid pressure through said passage means into said chamber acting on said first named proportioning valve means to assist the proportioning operation thereof.

3. A control valve according to claim 2, comprising first and second opposed effective areas on said first named proportioning valve means respectively subjected to the supplied and first named applied fluid pressure, said first area being predeterminately less than said second area.

4. A control valve according to claim 2, wherein said first named proportioning valve means includes an effective area in said chamber and subjected to the other applied fluid pressure to establish a force assisting the proportioning operation of said first named proportioning valve means.

5. A control valve comprising a housing, proportioning valve means defining with said housing a pressure fluid flow passage therethrough and a separate expansible fluid pressure chamber and movable in said housing for performing proportioning operations on fluid pressure supplied to said flow passage under preselected conditions, said proportioning valve means being operable generally in response to the supplied fluid pressure to effect the application of a proportionally reduced applied fluid pressure through said flow passage under preselected conditions, passage means in said poportioning valve means between said flow passage and said chamber, and other proportioning valve means movable in said passage means for performing proportioning operations on the supplied fluid pressure under other preselected conditions, said other proportioning valve means being operable generally in response to the supplied fluid pressure to effect the application of another proportionally reduced applied fluid pressure through said passage means into said chamber acting on said first named proportioning valve means to assist the proportioning operation thereof, first and second opposed effective areas on said first named proportioning valve means respectively subjected to the supplied and first named applied fluid pressures, said first area being predeterminately less than said second area, and said first named proportioning valve means including a third effective area additive to said first area and subjected to the other applied fluid pessure in said chamber.

6. A control valve according to claim 5, wherein said third area is substantially equal to the difference between said first and second areas.

7. A control valve comprising a housing, proportioning valve means defining with said housing a pressure fluid flow passage therethrough and a separate expansible fluid pressure chamber and movable in said housing for performing proportioning operations on fluid pressure supplied to said flow passage under preselected conditions, said proportioning valve means being operable generally in response to the supplied fluid pressure to effect the application of a proportionally reduced applied fluid pressure through said flow passage under preselected conditions, passage means in said proportioning valve means between said flow passage and said chamber, and other proportioning valve means movable in said passage means for performing proportioning operations on the supplied fluid pressure under other preselected conditions, said other proportioning valve means being operable generally in response to the supplied fluid pressure to effect the application of another proportionally reduced applied fluid pressure through said passage means into said chamber acting on said first named proportioning valve means to assist the proportioning operation thereof, said first named proportioning valve means includes resiliently urged means movable in said housing and defining therewith said flow passage and chamber, said resiliently urged means being initially movable in response to the supplied and first named applied fluid pressure of a first predetermined value toward an isolating position in said housing isolating the supplied and first named applied fluid pressures and said resiliently urged means being thereafter further movable in response to its own force and increases in the supplied fluid pressure in excess of the first predetermined value and a second predetermined value predeterminately greater than said first predetermined value acting thereon toward a metering position establishing the first named applied fluid pressure in first and second predetermined ratios with the supplied fluid pressure in excess of the first and second predetermined values, respectively, said passage means being in said resiliently urged means, said other proportioning valve means including other resiliently urged means movable in said passage means, said other resiliently urged means being movable against its own force in response to the supplied fluid pressure acting thereon between the second predetermined value and a third predetermined value predeterminately greater than the second predetermined value toward a metering position in said other passage establishing the other applied fluid pressure in said chamber in another predetermined ratio with the supplied fluid pressure between the second and third predetermined values to assist the proportioning operation of said first named resiliently urged means, and said first named and other resiliently urged means being respectively movable toward open flow passage and open passage means positions to blend the supplied fluid pressure and first named and other applied fluid pressures when the supplied fluid pressure exceeds the third predetermined value.

8. A control valve according to claim 7, wherein said first named resiliently urged means includes piston means movable in said housing and defining therewith said flow passage and said chamber, first and second opposed effective areas on said piston means respectively subjected to the supplied and first named applied fluid pressures, and resilient means urging said piston means toward its open flow passage position, said piston means being initially movable against said resilient means toward its isolating position in response to the supplied and first named applied fluid pressures of the first predetermined value respectively acting on said first and second opposed areas and being thereafter further movable in response to the supplied fluid pressure in excess of the first and second predetermined values acting on said first area and assisted by said resilient means toward its metering position establishing the first named applied fluid pressure acting on said second area in the first and second predetermined ratios with the supplied fluid pressure in excess of the first and second predetermined values, respectively, and a third effective area on said piston means in said chamber additive to said first area and subjected to the other applied fluid pressure in said chamber to assist the proportioning operation of said piston means.

9. A control valve according to claim 7, comprising a valve seat on said piston means about said flow passage, and valve means movable in said piston means for engagement with said valve seat, said valve seat being disengaged from said valve means in the open flow passage and metering positions of said piston means and being engaged with said valve seat in the isolating position of said piston means, respectively.

10. A control valve according to claim 7, wherein said other resiliently urged means includes piston means movable in said passage means, resilient means engaged between said piston means and said first named resiliently urged means, first and second opposed effective areas on said piston means respectively subjected to the supplied and other applied fluid pressures, said piston means being movable toward its metering position in said passage means against said resilient means in response to said supplied fluid pressure between the second and third predetermined values acting on said first area to establish the other applied fluid pressure in said chamber acting on said second area in the other predetermined ratio with the supplied fluid pressure between the second and third predetermined values, and said piston means being further movable toward its open passage means position against said resilient means when the supplied fluid pressure acting on said first area exceeds the third predetermined value.

11. A control valve according to claim 10, comprising a valve seat on said first named resiliently urged means about said passage means, and valve means on said piston means for engagement with said valve seat, said resilient means urging said valve means into engagement with said valve seat isolating said flow passage and chamber when the supplied fluid pressure is less than the second predetermined value and said valve means being disengaged from said valve seat upon the movement of said piston means toward its respective metering and open passage means positions.

12. A control valve according to claim 9, wherein said other resiliently urged means includes other piston means movable in said passage means, another valve seat on said first named piston means about said passage means, other valve means on said other piston means, other resilient means engaged with said other piston means urging said other valve means toward a position engaged with said other valve seat and closing said passage means, fourth and fifth opposed effective areas on said other piston means respectively subjected to the supplied and other applied fluid pressures, said other piston means being movable toward its metering position in said passage means against said other resilient means disengaging said other valve means from said other valve seat in response to the supplied fluid pressure between said second and third determined values acting on said fourth area to establish the other applied fluid pressure in said chamber acting on said fifth area in the other predetemined ratio with the supplied fluid pressure between the second and third predetermined values and also acting on said third area to assist the proportioning operation of said first named piston means, and said other piston means also being further movable toward its open passage means position against said other resilient means and the other applied fluid pressure acting on said fifth area disengaging said other valve means from said other valve seat when the supplied fluid pressure acting on said fourth area exceeds the third predetermined value.

13. A control valve comprising a housing having inlet and outlet ports therein, a differential piston movable in said housing between said inlet and outlet ports and defining with said housing a separate expansible fluid pressure chamber, said piston having a smaller effective area presented to said inlet port and a larger effective area presented to said outlet port, a passage through said piston communicating said inlet and outlet ports, a valve positioned to control said passage, resilient means urging said piston toward passage open position, another passage in said piston communicating said inlet port and chamber, another valve positioned to control said other passage, said other valve being operable generally to establish metered pressure fluid communication between said inlet port and chamber under preselected conditions, and said piston including another effective area presented to said chamber and additive to said smaller area.

14. A control valve comprising a housing having inlet and outlet ports therein, proportioning valve means movable in said housing for controlling pressure fluid communication between said inlet and outlet ports and defining with said housing an expansible fluid pressure chamber, said proportioning valve means being movable in response to fluid pressure at said inlet port in excess of first and second predetermined values acting thereon toward a metering position in said housing establishing a metered reduced fluid pressure at said outlet port in first and second predetermined ratios with the fluid pressure at said inlet port in excess of the first and second predetermined values, respectively, passage means in said proportioning valve means between said inlet port and said chamber, and other proportioning valve means movable in said passage means for controlling pressure fluid communication therethrough between said inlet port and said chamber, said other proportioning valve means being movable in response to fluid pressure at said inlet port between the second predetermined value and a third predetermined value acting thereon toward a metering position in said passage means establishing another metered reduced fluid pressure in said chamber in another predetermined ratio with that at said inlet port between the second and third values, and an effective area on said first named proportioning value means in said chamber and subjected to the other metered fluid pressure therein to assist the metering actuation of said first named proportioning valve means when the supplied fluid pressures acting thereon is between the first and second predetermined values, said first named and other proportioning valve means being movable toward open pressure fluid communication positions between said inlet and outlet ports and between said inlet port and chamber when the fluid pressure at said inlet port acting thereon exceeds the third predetermined value, respectively.

15. A control valve according to claim 14, comprising opposed second and third effective areas on said first named pressure valve means respectively subjected to the fluid pressures at said inlet and outlet ports, said second area being predeterminately less than said third area and additive to said first named area.

16. A control valve according to claim 15, wherein said first named area is equal to the difference between said second and third areas.

17. A control valve acording to claim 14, wherein said first named proportioning valve means includes resiliently urged means, said resiliently urged means being movable against its own force in response to the fluid pressure at said inlet and outlet ports of the first predetermined value acting thereon toward an isolating position in said housing interrupting pressure fluid communication between said inlet and outlet ports and being thereafter further movable toward its metering position in response to the fluid pressure acting thereon at said inlet port in excess of the first and second predetermined values assisted by the force of said resiliently urged means to effect metered pressure fluid communication between said inlet and outlet ports and establish the reduced fluid pressure at said outlet port in the first and second predetermined ratios with the fluid pressure at said inlet port in excess of the first and second predetermined values, respectively, and said resiliently urged means also being movable toward its open pressure fluid communication position in said housing when the fluid pressure acting thereon at said inlet port exceeds the third predetermined value.

18. A control valve according to claim 14, wherein said other proportioning valve means includes resiliently urged means movable in said passage means, said resiliently urged means being movable against its own force in response to fluid pressure acting thereon at said inlet port between the second and third predetermined values toward its metering position in said passage means to establish the other reduced fluid pressure in said chamber in the other predetermined ratio with that at said inlet port between the second and third predetermined values, and said resiliently urged means being further movable against its own force toward its open pressure fluid communication position in said passage means when the fluid pressure acting thereon at said inlet port exceeds the third predetermined value.

19. A control valve according to claim 17, wherein said passage means is in said resiliently urged means, said other proportioning valve means including other resiliently urged means movable in said passage means, said other resiliently urged means being movable against its own force toward its metering position in said passage means in response to fluid pressure acting thereon at said inlet port between the second and third predetermined values to establish the other reduced fluid pressure in said chamber in the other predetermined ratio with that at said inlet port between the second and third predetermined values, and said other resiliently urged means also being further movable against its own force toward its open pressure fluid communication position in said passage means when the fluid pressure acting thereon at said inlet port exceeds the third predetermined value.

20. A control valve according to claim 17, wherein said first named resiliently urged means includes piston means movable between said inlet and outlet ports in said housing and defining therewith said chamber, said passage means being in said piston means and said area being on said piston means within said chamber, resilient means engaged with said piston means, and second and third opposed areas on said piston means respectively subjected to the fluid pressure at the inlet and outlet ports, said second area being smaller than said third area and additive to said first named area, said piston means being initially movable toward its isolating position against said resilient means in response to the fluid pressure at said inlet and outlet port of the first predetermined value respectively acting on said second and third areas and being thereafter further movable toward its metering position in response to the fluid pressure at said inlet port in excess of the first and second predetermined values acting on said second area and assisted by said resilient means establishing the first named reduced fluid pressure at said outlet port acting on said third area in the first and second predetermined ratios with the fluid pressure at said inlet port in excess of the first and second predetermined values, respectively, and said piston means also being movable toward its open pressure fluid communication position when the fluid pressure at said inlet port acting on said second area exceeds the third predetermined value.

21. A control valve according to claim 20, comprising a valve seat on said piston means between said inlet and outlet ports, and valve means movable in said piston means for engagement with said valve seat, said valve seat being disengaged from said valve means in the open pressure fluid communication position and the metering position of said piston means and being engaged with said valve means in the isolating position of said piston means.

22. A control valve according to claim 18, wherein said resiliently urged means includes piston means movable in said passage means, resilient means engaged between said piston means and said first named proportioning valve means, and a pair of opposed differential areas on said piston means respectively subjected to the fluid pressure at said inlet port and the other reduced fluid pressure in said chamber, said piston means being movable toward its metering position against said resilient means in response to the fluid pressure at said inlet port between the second and third predetermined values acting on one of said opposed areas to establish the other reduced fluid pressure in said chamber in the other predetermined ratio acting on the other of said opposed areas, and said piston means being further movable toward its open pressure fluid communication position against said resilient means and the other reduced fluid pressure in said chamber acting on said other opposed area when the fluid pressure at said inlet port acting on said one opposed area exceeds the third predetermined value.

23. A control valve according to claim 22, comprising a valve seat on said first named proportioning valve means about said passage means, and said piston means including valve means for engagement with said valve seat, said resilient means normally urging said piston means in a direction to engage said valve means with said valve seat interrupting pressure fluid cmmunication between said inlet port and said chamber and said valve means being disengaged from said valve seat when said piston means is in its metering and open pressure fluid communication positions, respectively.

24. A control valve according to claim 21, comprising another valve seat on said first named piston means about said passage means, said other proportioning valve means including other piston means movable in said passage means, other resilient means engaged between said first named and other piston means, fourth and fifth opposed differential areas on said other piston means respectively subjected to the fluid pressure at said inlet port and the other reduced fluid pressure in said chamber, said fourth area being predeterminately greater than said fifth area, and other valve means on said other piston means for engagement with said other valve seat, said other piston means being movable toward its metering position against said resilient means in response to the fluid pressure at said inlet port between the second and third predetermined values acting on said fourth area to disengage said valve means from said valve seat and establish the other reduced fluid pressure in said chamber acting on said fifth area in the other predetermined ratio with the fluid pressure at said inlet port between the second and third predetermined values, and said other piston means also being further movable toward its open pressure fluid communication position against said resilient means and the other reduced fluid pressure in said chamber acting on said fifth area and disengaging said other valve means from said other valve seat when the fluid pressure at said inlet port acting on said fourth area exceeds the third predetermined value.

25. A control valve comprising a housing, an inlet port, an outlet port, a pressure fluid flow passage between said inlet and outlet ports, proportioning valve means defining with said housing three expansible fluid pressure chambers and movable in said housing for performing proportioning operations on fluid pressure between two of said chambers under preselected conditions, said flow passage including said two chambers, said proportioing valve means being operable generally in response to fuid pressure in one of said two chambers to effect the application of a proportionally reduced opposed fluid pressure to the other of said two chambers, passage means in said proportioning valve means between said flow passage and the third of said three chambers, and other proportioning valve means movable in said first named proportioning valve means for performing proportioning operations on fluid pressure between said one of said two chambers and said third chamber under other preselected conditions, said other proportioning valve means bieng generally operable in response to fluid pressure in said one of said two chambers to effect the application of another proportionally reduced applied fluid pressure to said third chamber acting on said first named proportioning valve means to assist the proportioning operation thereof.

* * * * *

UNITED STATES PATENT OFFICE
CERTIFICATE OF CORRECTION

Patent No. __3,776,603__          Dated __December 4, 1973__

Inventor(s) __Richard C. Bueler__

It is certified that error appears in the above-identified patent and that said Letters Patent are hereby corrected as shown below:

Column 4, line 52, "valve" should read -- value --. Column 5, line 11, "1" should read -- 2 --; line 38, "rationing" should read -- ratioing --; line 51, delete "=", second occurrence, and insert a minus sign (-). Column 6, line 25, "communicating" should read -- communication --; line 37, "huasts" should read -- hausts --. Column 10, line 10, "determined" should read -- predetermined --. Column 11, line 1, "value" should read -- valve --. Column 13, line 7, "cmmunication" should read -- communication --.

Signed and sealed this 30th day of July 1974.

(SEAL)
Attest:

McCOY M. GIBSON, JR.
Attesting Officer

C. MARSHALL DANN
Commissioner of Patents